Figure 1:
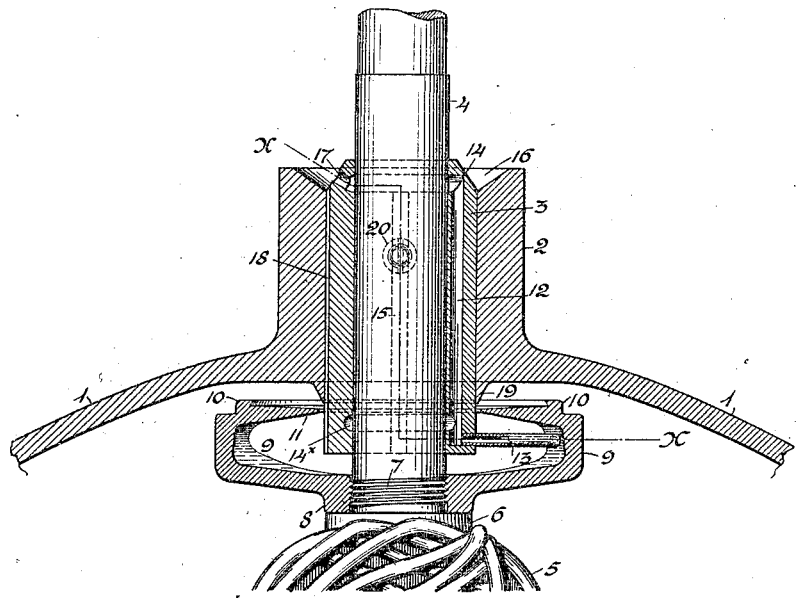

F. DIEHL.
LUBRICATING DEVICE.
APPLICATION FILED JUNE 12, 1908.

1,037,217.

Patented Sept. 3, 1912.

WITNESSES:

INVENTOR
Frederick Diehl,
BY
Henry J Miller
ATTORNEY

UNITED STATES PATENT OFFICE.

FREDERICK DIEHL, OF ELIZABETH, NEW JERSEY, ASSIGNOR TO DIEHL MANUFACTURING COMPANY, A CORPORATION OF NEW JERSEY.

LUBRICATING DEVICE.

1,037,217.      Specification of Letters Patent.      Patented Sept. 3, 1912.

Application filed June 12, 1908. Serial No. 438,027.

*To all whom it may concern:*

Be it known that I, FREDERICK DIEHL, a citizen of the United States, residing at Elizabeth, in the county of Union and State of New Jersey, have invented certain new and useful Improvements in Lubricating Devices, of which the following is a specification, reference being had therein to the accompanying drawings.

This invention relates to an improvement in lubricating devices designed more particularly for electric motors for special use, such as those employed in electric ceiling fans and those used for driving individual machines, in which the armature-shaft is vertically disposed; and it has for its object to insure the distributing of the lubricating fluid with certainty at all times while the machine is in operation.

As applied to an electric motor with a vertically arranged rotary armature-shaft, the device comprises a fixed bearing boss upon the motor casing above the armature provided with a detachable bushing having near its upper end and in its inner surface an annular distributing oil groove or recess with connected longitudinal grooves to carry the oil therefrom along the shaft, and a longitudinal oil supply duct connected at the upper end with the annular oil groove or recess and having at its lower end an outwardly extended inlet orifice terminating in the outer portion of an annular oil reservoir fixed upon and rotating with the armature-shaft, and which surrounds the lower end of the bearing sleeve. The bearing boss is provided at its upper end with an oil cavity into which leads an overflow passage from the distributing oil recess of the bearing sleeve, which latter is provided upon its outer surface with a flattened portion forming with the adjacent wall of the bearing boss an oil-returning duct leading downwardly into the oil reservoir. The inlet orifice of the supply duct is inclined outwardly and in the reverse direction to that in which the shaft and reservoir rotate, whereby, as the contained oil is thrown into the outer portion of the reservoir by centrifugal action, it is forced into the inlet orifice and upward through the oil supply duct into the distributing recess, whence it is caused to flow downwardly through the connected longitudinal grooves to lubricate the surface of the shaft along which it works into the reservoir in which the lower end of the bearing sleeve extends. As will be observed, any excess of oil supply to the oil recess at the top of the bearing sleeve will flow outwardly into the overflow cavity in the top of the bearing boss from which it will gravitate downwardly through the return duct and enter the reservoir.

Other features of the present improvement will be hereinafter explained and set forth in the appended claims.

Figure 2:
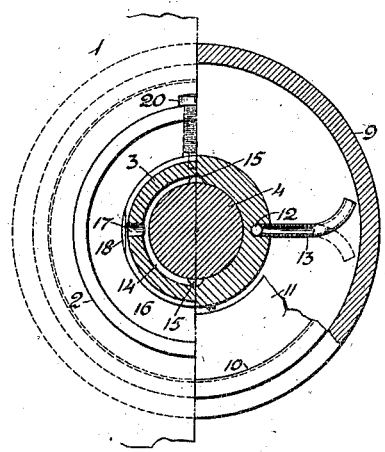

In the accompanying drawings, Figure 1 is a sectional elevation representing the upper portion of an electric-motor embodying the present improvement, and Fig. 2 a sectional plan of the same taken on the line $x$ $x$ of Fig. 1.

The upper end or cap 1 of the motor-frame is provided with a bearing boss 2 in which is removably fitted the cylindrical external surface of the sleeve 3 whose inner surface or bore is fitted to the vertical armature-shaft 4 carrying the armature 5. The shaft 4 is provided adjacent the armature 5 with a boss 6 and an adjacent threaded portion 7 to which is fitted the internally threaded hub 8 of the annular oil reservoir 9 shown with convergent and slightly toned upper and lower walls. The top of the reservoir 9 is provided with a reduced portion having an undercut annular rib 10 affording an annular oil receiving recess with a bottom slightly downwardly and inwardly inclined and forming with the upper wall of the oil cavity of the reservoir a thin tapering web 11 over which any oil caught in such recess gravitates into the bottom of the reservoir when the machine comes to rest. The undercut form of the rib 10 insures that any oil caught in the recess surrounded by it may not creep over the same and along the exterior of the reservoir downwardly upon the armature coils 5 to cause the injury of the latter.

The bearing sleeve is provided upon one side with a longitudinal supply duct 12 extending nearly throughout its length and having at its lower end a lateral opening in which is screwed the inner end of a radial tube 13 whose outer end is laterally curved to present an oil inlet orifice at an angle to the periphery of the reservoir 9. As will be observed by reference to Fig. 2, the threading of the inner end of the inlet tube 13 into the bearing sleeve permits it to assume the full-line position to adapt it to rotation of the shaft in one direction or the dotted-line position to enable it to perform its function with a shaft rotating in the opposite direction. For convenience in construction, the tube 13 is preferably formed separately from the sleeve 3, but as regards its function, it is practically a part of such sleeve, its mouth affording an orifice of the oil passage therein which is presented in a direction contrary to that of rotation of the shaft.

The inner or bearing surface of the sleeve 3 is provided near its top with an annular distributing oil groove or cavity 14 connected with the upper end of the supply duct 12 and with intersecting diametrically disposed longitudinal grooves 15 leading from such distributing recess to the lower end of the sleeve. It will thus be observed that in the rotation of the reservoir with the shaft, a free circulation of lubricant is provided through the inlet tube 13, supply duct 12, distributing recess 14 and delivery grooves 15 back to the reservoir. The upper end of the bearing boss is provided with a conical depression 16 forming with the reduced conical upper end of the bearing sleeve 3 an overflow cavity connected by means of the inclined lateral passage 17 in the sleeve 3 with the distributing recess 14. The passage 17 constitutes a combined vent and inspection aperture through which the attendent is enabled to ascertain whether the oil is in proper circulation through the distributing system so that just the required quantity of oil may be introduced into the reservoir to insure circulation without flooding the bearing. Below the lateral oil passage 17 the exterior of the sleeve 3 is flatted to form with the adjacent inner surface of the bearing boss an oil-return duct 18 through which any oil overflowing into the cavity 16 from the circulating system is enabled to run down the exterior of the sleeve 3 to the interior of the reservoir 9. In order to prevent the spreading of the oil upon the cap 1 of the motor casing, the latter is provided with a depending annular tapering flange 19 which tends to lead the overflow oil moving downwardly along the exterior of the sleeve 3 into the reservoir where it is deposited for circulation. It sometimes happens that the helical mark of the turning tool upon the shaft is in such direction as to induce an upward flow of the oil between its surface and that of the bearing in which it is journaled. To insure the effective operation of the lubricating system under such condition, I therefore sometimes provide a lower distributing cavity 14˟ at the level of or a little above the inlet tube 13 by means of which oil from the supply duct is delivered at the lower end of the journal from which it may be led upwardly through the longitudinal grooves 15 to supply the entire length of the bearing. Although in certain cases the provision of two or more of such annular oil grooves or recesses spaced at intervals along the length of the bearing may be found advantageous, a single distributing groove 14 will ordinarily be found sufficient, and this may be located at either end of the bearing, as the conditions may require, for effective lubrication of the journal.

While the abutting faces of the boss 6 and hub 8 of the reservoir 9 may in practice be suitably faced to make an oil-tight joint so as to insure the confinement of the oil to the reservoir without leakage, a suitable washer may be interposed if desired.

The sleeve 3 may be secured in position within the bearing boss 2 by means of a set-screw 20 tapped through the side of the latter and having its point entering a corresponding aperture in the exterior of the sleeve, as represented in Fig. 2.

From the foregoing description it will be seen that, although designed particularly for application to electric motors having vertical armature-shafts, the present improvement is not limited to such machines, but is suitable for many other conditions in which the rotating part is adapted to carry the oil reservoir and the bearing is adapted for the oil-circulating system herein shown and described. It is also to be understood that the present improvement is susceptible of considerable variation in construction and arrangement of parts from that disclosed herein, and that the invention is not therefore limited to the details of construction set forth in the foregoing description and shown in the accompanying drawings.

Having thus set forth the nature of the invention, what I claim herein is:—

1. A lubricating device comprising a rotary shaft carrying an annular oil-reservoir having overhanging walls, and a fixed bearing for said shaft having independent longitudinal oil-supply and return ducts, the former having a connection with the outer portion of said reservoir, an external overflow cavity connected with the oil-return duct, an oil-distributing groove or recess connected with the supply-duct, and a longitudinal delivery groove in the inner bearing surface connected with said oil-distributing groove or recess.

2. A lubricating device comprising a rotary shaft carrying an annular oil-reservoir having overhanging walls, a bearing boss having an annular depression affording an overflow cavity in its upper end, and a bearing sleeve internally fitted to said shaft and externally fitted within the bearing boss and provided with a longitudinal oil-supply duct having a connection with the outer portion of said reservoir, an oil-distributing groove or recess in the inner surface of said sleeve having a connection with said oil-supply duct, longitudinal oil-delivery grooves connected with said distributing groove or recess, and an overflow passage leading from said overflow cavity intermediate said boss and said sleeve into the oil-reservoir.

3. A lubricating device comprising a rotary shaft carrying an annular oil-reservoir having overhanging walls, a bearing boss having an annular depression affording an overflow cavity in its upper end and an inwardly tapering annular flange depending from its lower end, and a bearing sleeve internally fitted to said shaft and externally fitted within the bearing boss and provided with a longitudinal oil-supply duct having a connection with the outer portion of said reservoir, an oil-distributing groove or recess in the inner surface of said sleeve having a connection with said oil-supply duct, longitudinal oil-delivery grooves connected with said distributing groove or recess, an overflow passage intermediate the distributing groove or recess and the overflow cavity, and an overflow passage leading from said overflow cavity into the oil-reservoir.

4. A lubricating device comprising a rotary shaft carrying an annular oil-reservoir having overhanging walls, a bearing boss having an annular depression affording an overflow cavity in its upper end, a bearing sleeve internally fitted to said shaft and externally fitted within the bearing boss and provided with a longitudinal oil-supply duct having a connection with the outer portion of said reservoir, an oil-distributing groove or recess in the inner surface of said sleeve having a connection with said oil-supply duct, longitudinal oil-delivery grooves connected with said distributing groove or recess, an overflow passage leading from said overflow cavity into the oil-reservoir, and means for detachably securing said sleeve within the bearing boss.

5. A lubricating device comprising a rotary shaft, an annular reservoir carried by said shaft and provided with an axial opening and an undercut annular rib surrounding the same upon said upper side, a bearing boss having an annular depression in its upper end affording an overflow cavity, and a bearing sleeve internally fitted to said shaft and externally fitted within the bearing boss and provided with a longitudinal oil-supply duct having a connection with the outer portion of said reservoir, an oil-distributing groove or recess in the inner surface of said sleeve having a connection with said oil-supply duct, longitudinal oil-delivery grooves connected with said distributing groove or recess, an overflow passage intermediate the distributing groove or recess and the overflow cavity, and an overflow passage leading from said overflow cavity into the oil-reservoir.

In testimony whereof, I have signed my name to this specification, in the presence of two subscribing witnesses.

FREDERICK DIEHL.

Witnesses:
H. A. KORNEMANN, Jr.,
JOSEPH F. JAQUITH.